United States Patent
McCausland

(10) Patent No.: US 6,598,517 B1
(45) Date of Patent: Jul. 29, 2003

(54) VACUUM CABINET DEVICE

(76) Inventor: Richard McCausland, 4759 Galway, Mound, MN (US) 55364

( * ) Notice: Subject to any disclaimer, the term of this patent is extended or adjusted under 35 U.S.C. 154(b) by 0 days.

(21) Appl. No.: 10/085,685

(22) Filed: Mar. 1, 2002

(51) Int. Cl.[7] .............................. A23L 1/00; B65B 1/04
(52) U.S. Cl. .................... 99/472; 99/467; 99/468; 141/65; 141/98; 312/205; 312/410
(58) Field of Search .................... 99/357, 467, 472; 62/100, 127, 169, 268, 55.5; 141/65, 98, 192; 236/94; 340/527; 312/205, 410, 236; 426/231, 524

(56) References Cited

U.S. PATENT DOCUMENTS

| | | | | |
|---|---|---|---|---|
| 427,822 A | * | 5/1890 | Anderson | 99/468 X |
| 1,347,194 A | * | 7/1920 | Washington | 909/472 X |
| 2,119,320 A | * | 5/1938 | Dobrowsky | 99/472 X |
| 3,362,621 A | * | 1/1968 | Verfuss | 99/472 X |
| 3,813,896 A | * | 6/1974 | Lebahn | 62/127 X |
| 3,998,347 A | * | 12/1976 | Mahl | 99/472 X |
| 4,214,853 A | * | 7/1980 | Mahl | 62/55.5 |
| 4,387,578 A | * | 6/1983 | Paddock | 62/127 |
| D324,965 S | * | 3/1992 | Nelsen | D6/448 |
| 5,405,194 A | * | 4/1995 | Binder | 312/205 |
| 6,090,422 A | * | 7/2000 | Taragan et al. | 426/231 |
| 6,148,875 A | * | 11/2000 | Breen | 141/65 |

* cited by examiner

Primary Examiner—Timothy F. Simone

(57) ABSTRACT

A vacuum cabinet device for storing and keeping dry goods. The vacuum cabinet device includes a housing that has an access opening for accessing an interior of the housing. A door is provided for sealing the access opening. A pump is mounted in the interior of the housing for pumping air out of the interior of the housing whereby a vacuum is created in the interior of the housing. A valve assembly is mounted on the door for permitting air to enter the interior of the housing thereby pressurizing the interior of the housing.

12 Claims, 4 Drawing Sheets

VACUUM CABINET DEVICE

BACKGROUND OF THE INVENTION

1. Field of the Invention

The present invention relates to storage containers and more particularly pertains to a new vacuum cabinet device for storing and keeping dry goods.

2. Description of the Prior Art

The use of storage containers is known in the prior art. More specifically, storage containers heretofore devised and utilized are known to consist basically of familiar, expected and obvious structural configurations.

Known prior art includes U.S. Pat. No. 427,822; U.S. Pat. No. 6,090,422; U.S. Pat. No. 1,347,194; U.S. Pat. No. 6,148,875; U.S. Pat. No. 3,998,347; U.S. Pat. No. 5,405,194; U.S. Pat. No. 4,214,853; U.S. Pat. No. 3,362,621; and U.S. Pat. No. Des. 324,965.

It is well known that the shelf life of foods can be extended when they are stored in a vacuum. This is particularly true for dry goods such as, for example, bread, crackers and cereal. The shelf life of dry goods is generally reduced by exposure to moisture. When dry goods are exposed to the air they absorb the moisture carried by the air molecules. As the dry goods are exposed to more moisture they become stale and less fresh. Additionally, as the dry goods continue to be exposed to the moisture they become more susceptible to mold growth thereby shortening their shelf life.

Although vacuum containers or compartments are known in the prior art many of the conventional devices developed to extend the shelf life of goods have employed either large containers with bulky vacuum inducing means and elaborate vacuum release mechanisms or single small containers that limit their use to a particular item.

SUMMARY OF THE INVENTION

In view of the foregoing disadvantages inherent in the known types of storage containers now present in the prior art, the present invention provides a new vacuum cabinet device construction wherein the same can be utilized for storing and keeping dry goods.

The general purpose of the present invention, which will be described subsequently in greater detail, is to provide a new vacuum cabinet device which has many of the advantages of the storage containers mentioned heretofore and many novel features that result in a new vacuum cabinet device which is not anticipated, rendered obvious, suggested, or even implied by any of the prior art storage containers, either alone or in any combination thereof.

While these devices fulfill their respective, particular objectives and requirements, the aforementioned patents do not disclose a new vacuum cabinet device. The inventive device includes a housing that has an access opening for accessing an interior of the housing. A door is provided for sealing the access opening. A pump is mounted in the interior of the housing for pumping air out of the interior of the housing whereby a vacuum is created in the interior of the housing. A valve assembly is mounted on the door for permitting air to enter the interior of the housing thereby pressurizing the interior of the housing.

An object of the present invention is to provide a new vacuum cabinet device that eliminates the need for containers with covers to protect the dry goods. The present invention permits a user to keep the dry goods in the containers in which they were purchased thereby saving a user money on additional storage containers.

Another object of the present invention is to provide a new vacuum cabinet device that saves a user money by extending the shelf life of their dry goods. The longer the shelf life of a dry good the more time there is to consume the dry good instead of throwing it away.

There has thus been outlined, rather broadly, the more important features and objects of the vacuum cabinet device in order that the detailed description thereof that follows may be better understood, and in order that the present contribution to the art may be better appreciated.

Before explaining at least one embodiment of the invention in detail, it is to be understood that the invention is not limited in its application to the details of construction and to the arrangements of the components set forth in the following description. Additionally, the present invention is not limited to the construction illustrated in the drawings. The invention is capable of other embodiments and of being practiced in various ways. Also, it is to be understood that the phraseology and terminology employed herein are for the purpose of description and should not be regarded as limiting. Therefore, the claims should be regarded as including such equivalent constructions.

BRIEF DESCRIPTION OF THE DRAWINGS

The drawings of the preferred embodiment annexed herein include.

DESCRIPTION OF THE PREFERRED EMBODIMENT

Figure 1:
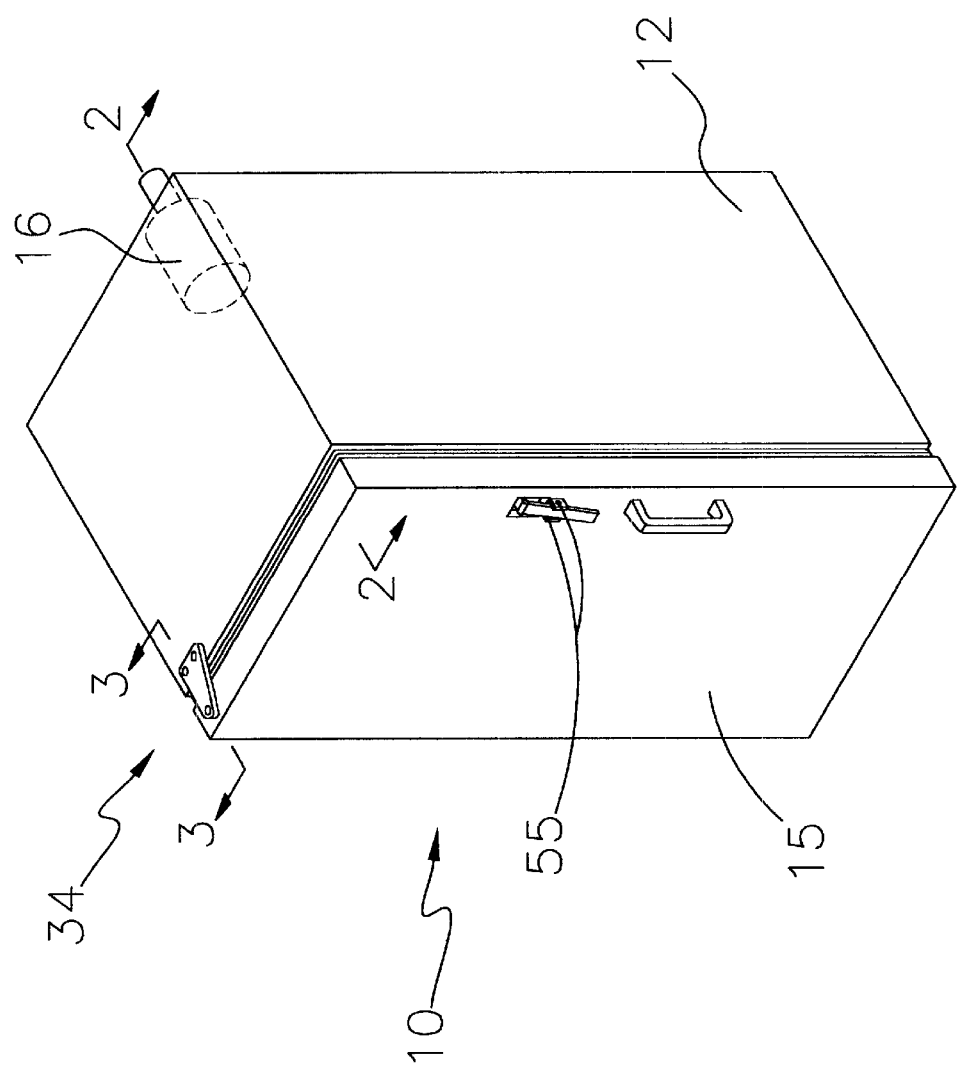
FIG. 1 is a perspective view of a new vacuum cabinet device according to the present invention.

Referring to FIG. 1 a new vacuum cabinet device is designated by the reference numeral 10. The vacuum cabinet device 10 generally comprises a housing 12 that has an access opening 13 for accessing an interior 14 of the housing 12. A door 15 is provided for sealing the access opening 13. A pump 16 is mounted in the interior 14 of the housing 12 for pumping air out of the interior 14 of the housing 12 whereby a vacuum is created in the interior 14 of the housing 12. A valve assembly 20 is mounted on the door 15 for permitting air to enter the interior 14 of the housing 12 thereby pressurizing the interior 14 of the housing 12 and permitting a user to open the door 15.

The housing 12 has front 21 and back 22 walls and a peripheral 23 wall extending therebetween. The access opening 13 may extend through the front wall 21 of the housing 12 and the pump 16 may extend through the back wall 22 of the housing 12. The housing 12 may comprise a substantially rigid material capable of withstanding pressures below the normal atmospheric pressure. The housing 12 may comprise materials such as, for example, aluminum and steel. However, other types of materials may also be employed.

Figure 2:
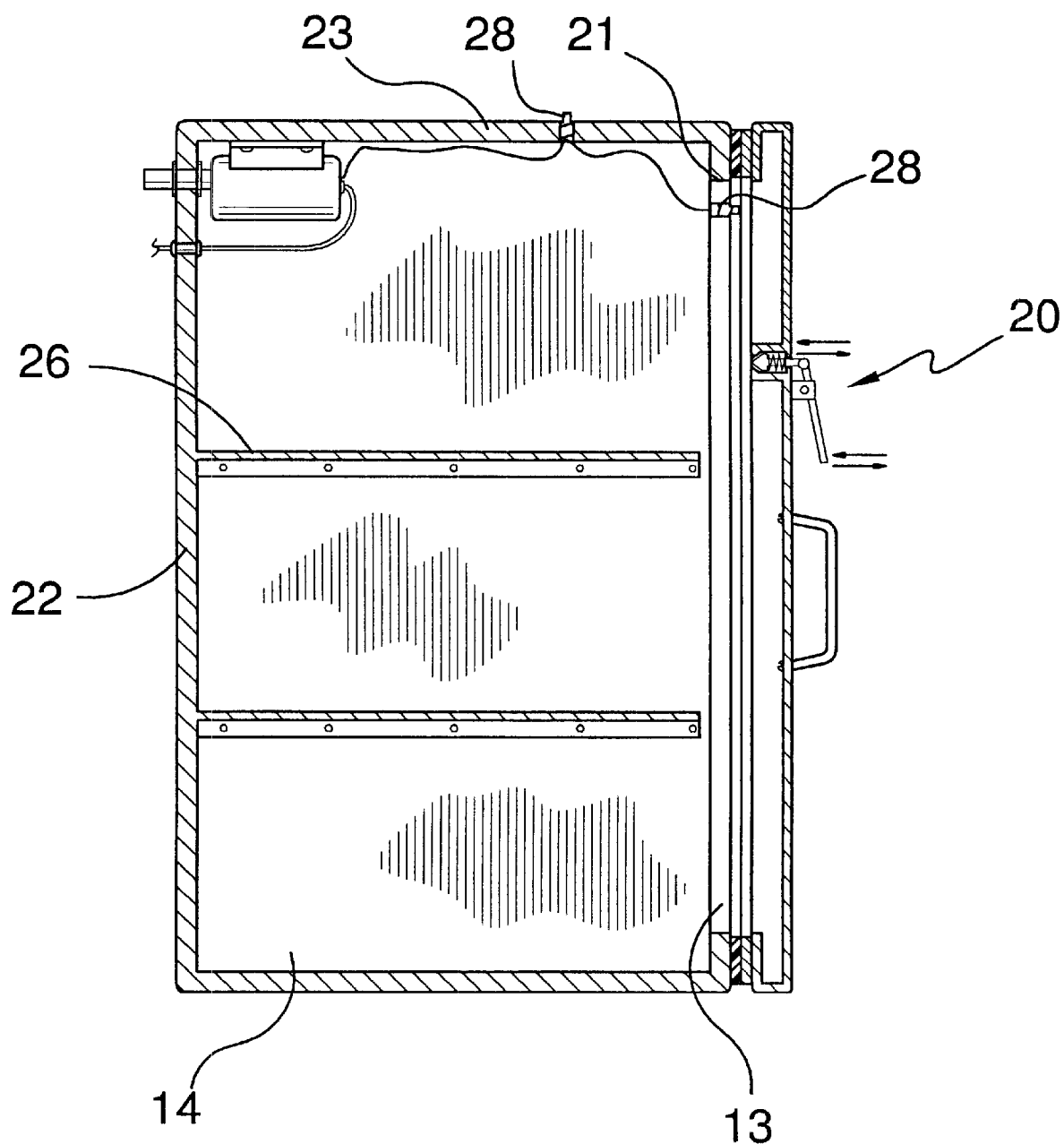
FIG. 2 is a cross sectional view of the present invention taken along line 2—2 of FIG. 1.

As illustrated in FIG. 2, at least one shelf 26 may be mounted in the interior 14 of the housing 12. The at least one shelf 26 may be mounted to the back wall 22 and may extend generally toward the access opening 13. The at least one shelf 26 may additionally be mounted to a pair of side portions of the peripheral wall 23 of the housing. As particularly illustrated in FIG. 2, at least one shelf 26 may include pair of shelves.

Figure 3:
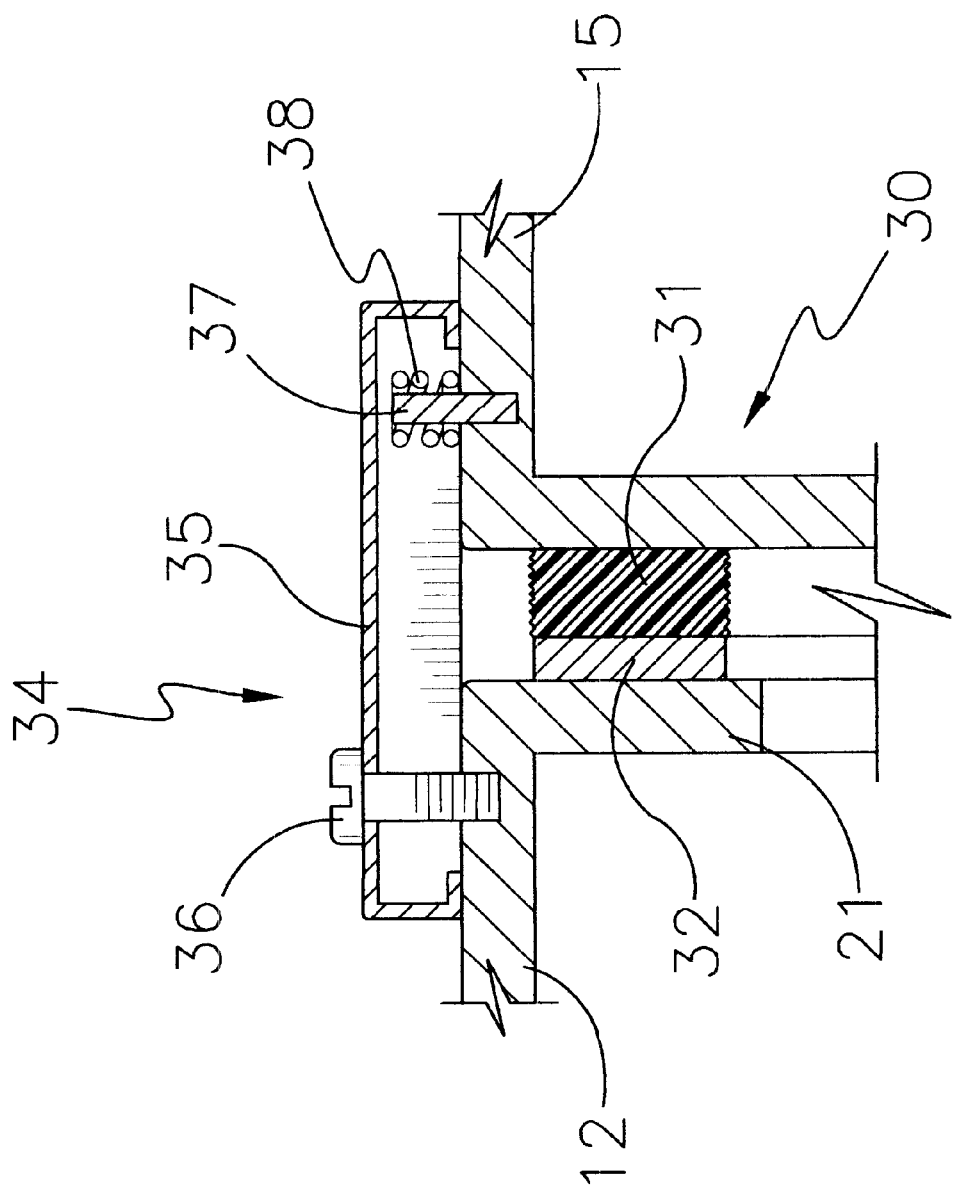
FIG. 3 is a fractional cross sectional view of the present invention taken along line 3—3 of FIG. 1.

As illustrated in FIGS. 2 and 3, a means of sealing 30 the access opening 13 may be mounted to and may extend between the front wall 21 of the housing 12 and an inner surface of the door 15. The means of sealing 30 the access opening 13 may include an elongate seal member 31 that is mounted to the inner surface of the door 15 and which is preferably positioned about a perimeter of the door 15. In one embodiment of the present invention, the seal member 31 may comprise a material having magnetic properties such as, for example, a metal or a metal covered in a generally flexible material such as a plastic.

An elongate magnet member 32 may be mounted to an outer surface of the housing 12 and may be positioned about a perimeter of the access opening 13. In one embodiment of the present invention, the seal member 31 is selectively abuttable against the magnet member 32 when the door 15 blocks the access opening 13 permitting the pump 16 to pump air out of the interior 14 of the housing 12.

The pump 16 may comprise a conventional pump having a motor and an inlet and an outlet for taking air from the interior 14 of the housing 12 and blowing it out. A means of actuating 28 the pump 16 may also be provided. The means of actuating 28 the pump 16 may comprise a conventional manual switch or may comprise a switch that is triggered by the closing of the access opening 13 with the door 15.

As illustrated in FIGS. 1 and 3, a hinge assembly 34 may be mounted to and may extend between the door 15 and the housing 12 for permitting the door 15 to automatically move from an open position to a closed position. The open position is characterized by the access opening 13 being accessible to a user. The closed position is characterized by the access opening 13 being inaccessible to a user.

As particularly illustrated in FIG. 3, the hinge assembly 34 may include a plate 35 that is mounted to and which may extend between the housing 12 and the door 15. The plate 35 may have a width that tapers from the housing 12 toward the door 15. The plate 35 may also include a perimeter wall extending away from the plate 35 for positioning the plate 35 a distance above the housing 12 and the door 15. The perimeter wall of the plate 35 may also include a foot portion extending away from the perimeter wall for coupling the perimeter wall to the housing 12 and the door 15.

The hinge assembly 34 may additionally include a means of fastening 36 the plate 35 to the housing 12. The means of fastening 36 the plate 35 may extend through the plate 35 and may be mounted to the housing 12. The means of fastening 36 the plate 35 may comprise a bolt. However, other means of fastening the plate 35 may be employed.

The hinge assembly 34 may additionally include a pin 37 that is mounted to and which extends upwardly away from the door 15. The pin 37 may be positioned generally between the door 15 and the plate 35. A means of biasing 38 the door 15 from the open position toward the closed position may be mounted to the door 15 and may be positioned about the pin such that when the door 15 is moved from the closed position toward the open position the means of biasing 38 the door 15 is compressed. As a user releases the door the means of biasing 38 the door 15 decompresses moving the door 15 from the open position toward the closed position.

The means of biasing 38 the door 15 from the open position toward the closed position may comprise a coiled spring. However, other means of biasing the door 15 from the open position toward the closed position may be employed.

Figure 4:
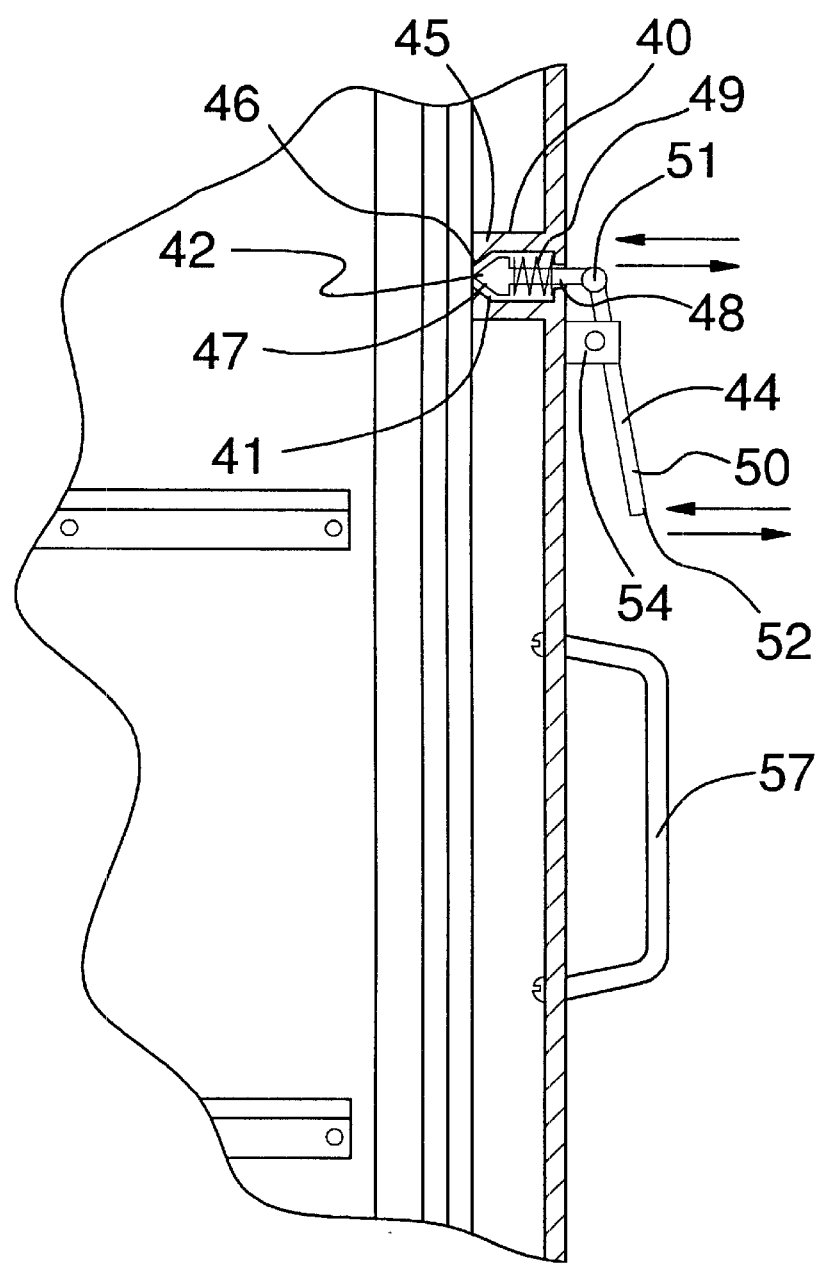
FIG. 4 is a detailed side elevational view of the present invention.

The valve assembly 20 may include a valve body 40 that is mounted to and extends through the door 15. As illustrated in FIGS. 2 and 4, the valve body 40 has a bore 41 extending therein that is in fluid communication with the interior 14 of the housing 12. A plug 42 may be selectively disposed in the bore 41 of the valve body 40 for selectively plugging the bore 41 and preventing air from entering the interior 14 of the housing 12.

The valve assembly 20 may additionally include an actuator 44 mounted to the plug 42 for selectively moving the plug 42 between a seated position and an unseated position. In one embodiment of the present invention, the air enters the interior 14 of the housing 12 through the bore 41 when the plug 42 is in the unseated position and air does not enter the interior 14 of the housing 12 when the plug 42 is in the seated position.

The bore 41 of the valve body 40 is defined by a wall 45 that has an inner beveled surface further defining a seat 46 for receiving the plug 42. The plug 42 is selectively disposed in the seat when the plug 42 is in the seated position.

As illustrated in FIG. 4, the plug 42 may include a tapered first end portion 47 which is removably positionable in the seat 46. The plug 42 may additionally include a post portion 48 that extends axially through the bore 41 of the valve body 40. An end of the post portion 48 may be pivotally coupled to the actuator 44.

A means of biasing 49 the plug 42 from the unseated position toward the seated position may also be provided. The means of biasing 49 the plug 42 may be mounted between the plug 42 and the actuator member 44 and may be positioned about the post portion 48 of the plug 42. The means of biasing 49 the plug 42 may comprise a coiled spring. However, other means of biasing the plug 42 between the seated position and the unseated position may be provided.

The actuator 44 may include an elongate shaft 50 that has first 51 and second 52 opposed ends. The first end 51 of the elongate shaft 50 is mounted to the end of the post portion 48 of the plug 42. A longitudinal axis of the shaft 50 may extend generally parallel to the door 15.

A bracket 54 may be mounted to an outer surface of the door 15 and may be pivotally coupled to the actuator 44 for more easily permitting a user to position the plug 42 between the seated position and the unseated position. The bracket 54 may include a pair of spaced ears 55 that are positioned generally adjacent to the bore 41 of the valve body 40. The actuator 44 may be positioned between and may be coupled to the pair of spaced ears 55.

A handle 57 may be mounted to an outer surface of the door 15 for permitting a user to open and close the door 15. The handle 57 may have a generally arcuate shape with a pair of ends. Each of the ends of the handle may be mounted to the outer surface of the door 15. Additionally, the handle 57 may be positioned generally adjacent to the actuator 44 for permitting a user to hold onto the handle 57 with their fingers and depress the second end 52 of the actuator 44 with their thumb.

In use, dry goods are stored in the interior 14 of the housing 12. Once the goods are in the interior 14 of the housing 12 the door 15 may be closed such that the seal member 31 selectively abuts the magnet member 32 creating an airtight seal between the door 15 and the housing 12. Once the door 15 is closed the pump 16 may then pump air in the interior 14 of the housing 12 out thus decreasing the air pressure in the interior 14 of the housing 12.

To retrieve dry goods from the interior 14 of the housing 12 a user depresses the second end 52 of the actuator 44. The actuator pivots with respect to the bracket 54 pulling on the post portion 48 of the plug 42. The post portion 48 of the plug 42 moves the plug 42 from the seated position toward the unseated position permitting air to enter the interior 14 of the housing 12 through the bore 41 of the valve body 40. As air enters the interior 14 of the housing 12 the pressure in the interior 14 increases to approximately normal atmospheric pressure permitting a user to open the door 15 and remove the dry goods.

Although the present invention has been discussed with reference to particular embodiments it will be understood that other variations and modifications to the discussed embodiments is possible without departing from the scope of the present invention.

I claim:

1. A vacuum cabinet device for storing and keeping dry goods fresh, said device comprising:
   a housing having an access opening for accessing an interior, a door for sealing said access opening;
   a pump being mounted in said interior of said housing for pumping air out of said interior of said housing whereby a vacuum is created in said interior of said housing;
   a valve assembly being mounted on said door for permitting air to enter said interior of said housing thereby pressurizing said interior of said housing, wherein said seal member comprises a magnetic material, an elongate magnet member being mounted to an outer surface of said housing and positioned about a perimeter of said access opening, wherein said seal member is selectively abuttable against said magnet member when said door blocks said access opening and;
   a means of sealing said access opening being mounted to and extending between a front wall of said housing and an inner surface of said door, wherein said means of sealing said access opening includes an elongate seal member being mounted to an inner surface of said door and positioned about a perimeter of said door.

2. A vacuum cabinet device for storing and keeping dry goods fresh, said device comprising:
   a housing having an access opening for accessing an interior, a door for sealing said access opening;
   a pump being mounted in said interior of said housing for pumping air out of said interior of said housing whereby a vacuum is created in said interior of said housing;
   a valve assembly being mounted on said door for permitting air to enter said interior of said housing thereby pressurizing said interior of said housing;
   a hinge assembly being mounted to and extending between said door and said housing for permitting said door to automatically move from an open position to a closed position, said hinge assembly comprises:
      a plate being mounted to and extending between said housing and said door;
      a means of fastening said plate extending through said plate and being mounted to said housing;
      a pin being mounted to and extending away from said door, said pin being positioned generally between said door and said plate; and
      a means of biasing said door from an open position toward a closed position, said means of biasing said door being mounted to said door and positioned about said pin.

3. The vacuum cabinet device of claim 2, wherein said means of biasing said door from an open position toward a closed position comprising a coiled spring.

4. A vacuum cabinet device for storing and keeping dry goods fresh, said device comprising:
   a housing having an access opening for accessing an interior, a door for sealing said access opening;
   a pump being mounted in said interior of said housing for pumping air out of said interior of said housing whereby a vacuum is created in said interior of said housing;
   a valve assembly being mounted on said door for permitting air to enter said interior of said housing thereby pressurizing said interior of said housing, wherein said valve assembly includes:
      a valve body being mounted to and extending through said door, said valve body having a bore extending therein;
      a plug being selectively disposed in said bore of said valve body for selectively plugging said bore and preventing air from entering said interior of said housing; and
      an actuator being mounted to said plug for selectively moving said plug between a seated position and an unseated position, wherein air enters said interior of said housing when said plug is in said unseated position and air does not enter said interior of said housing when said plug is in said seated position.

5. The vacuum cabinet device of claim of claim 4, additionally includes a means of actuating said pump, said means of actuating said pump being operationally coupled between said housing and said door, wherein a user closing said door triggers said means of actuating said pump.

6. The vacuum cabinet device of claim 4, wherein said bore of said valve body is defined by a wall having an inner beveled surface further defining a seat, said plug being selectively disposed in said seat.

7. The vacuum cabinet device of claim 6, wherein said plug includes:
   a tapered first end portion removably positionable in said seat;
   a post portion extending axially through said bore of said valve body and being coupled to said actuator.

8. The vacuum cabinet device of claim 7, wherein said actuator includes an elongate shaft having first and-second opposed ends, said first end being mounted to an end of said post portion of said plug, a longitudinal axis of said shaft extending generally parallel to said door.

9. The vacuum cabinet device of claim 8, additionally including a bracket being mounted to an outer surface of said door for pivotally coupling said actuator to said door, said bracket being pivotally coupled to said bracket.

10. The vacuum cabinet device of claim 9, wherein said bracket includes a pair of spaced ears being positioned generally adjacent to said bore of said valve body, said actuator being position between and coupled to said pair of spaced ears.

11. The vacuum cabinet device of claim 6, additionally including a means of biasing said plug from said unseated position toward said seated position, said means of biasing said plug being mounted between said plug and said actuator member.

12. The vacuum cabinet device of claim 11, wherein said means of biasing said plug comprises a coiled spring.

* * * * *